Feb. 25, 1930.  J. T. LALLY  1,748,885
PIPE HOLDER
Filed June 23, 1925   3 Sheets-Sheet 1

Inventor.
John T. Lally.
by his Attorneys

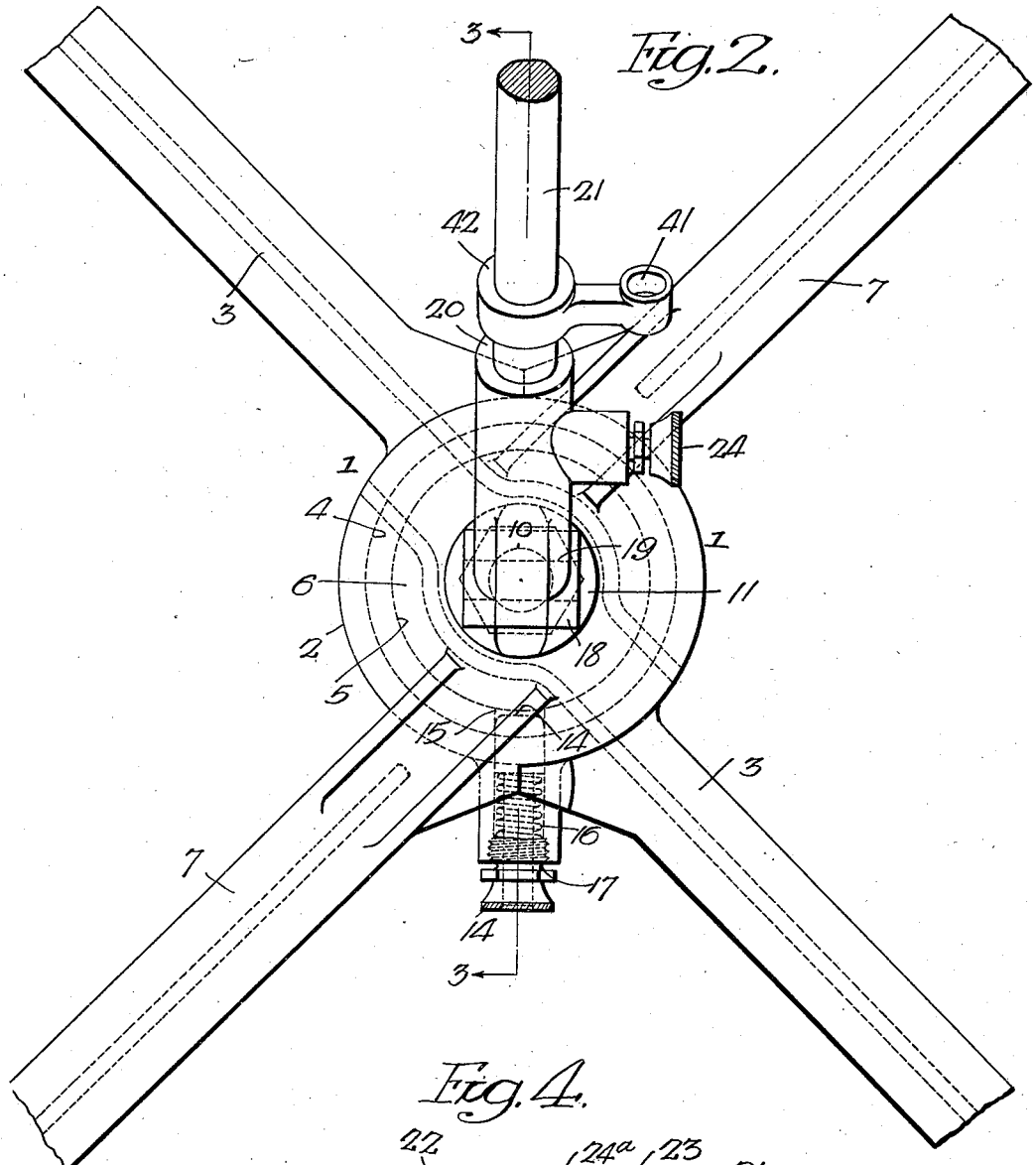

Feb. 25, 1930.    J. T. LALLY    1,748,885
PIPE HOLDER
Filed June 23, 1925    3 Sheets-Sheet 3
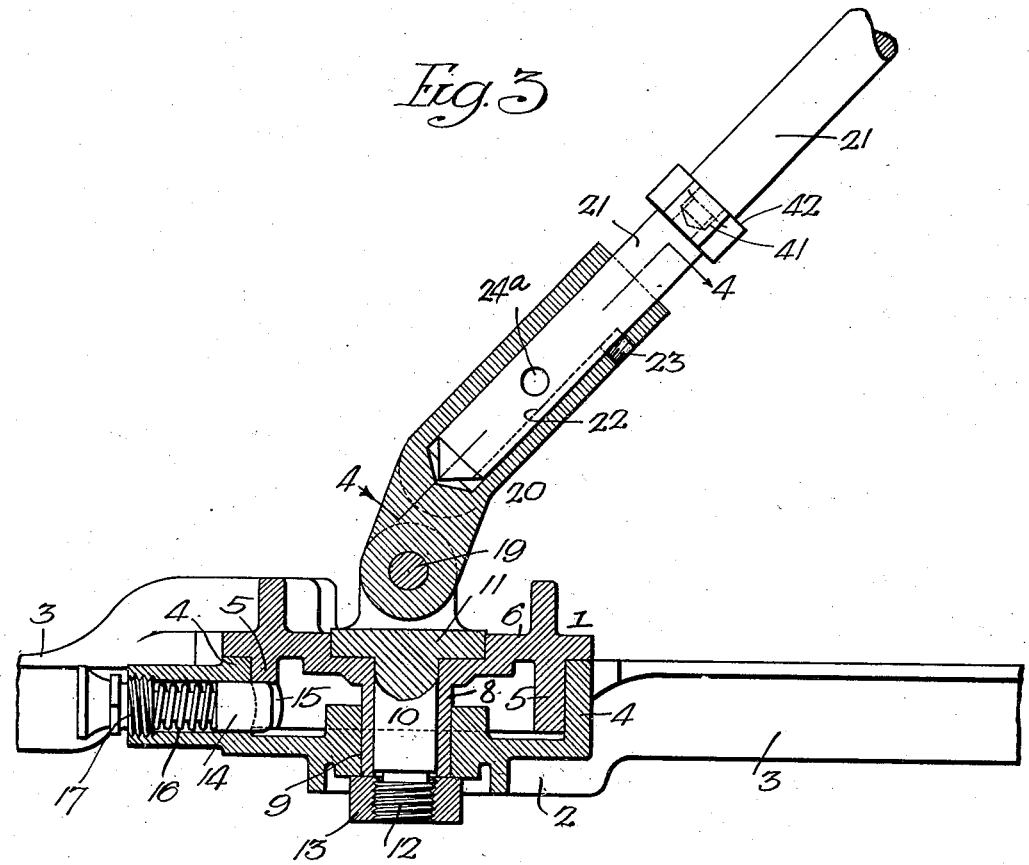
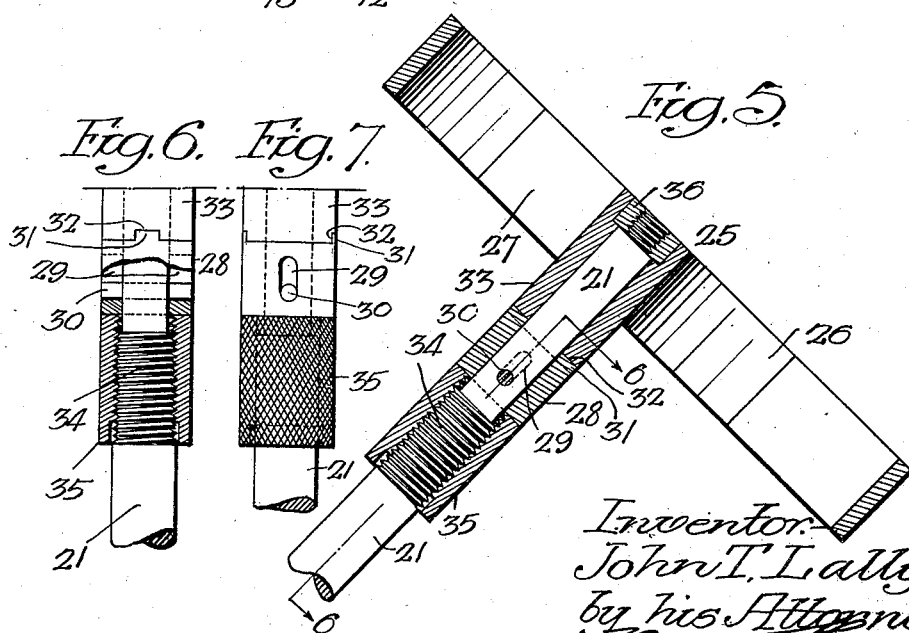
Inventor.
John T. Lally.
by his Attorneys.

Patented Feb. 25, 1930

1,748,885

UNITED STATES PATENT OFFICE

JOHN T. LALLY, OF WILMINGTON, DELAWARE

PIPE HOLDER

Application filed June 23, 1925. Serial No. 39,115.

One object of the invention is to improve the construction of pipe or nozzle holders, especially adapted for high pressure fire systems.

Another object of the invention is to construct the holder so that it will support the pipe or nozzle, the arrangement being such that it can be manipulated by a fireman to project a stream in any direction desired.

A further object of the invention is to provide the holder with two pipe clamps of different diameters, either one of which can be brought into alignment to engage a pipe.

The invention also relates to certain means for holding the pivoted base section in an extended position and to the provision of means for supporting the outer end of the holder.

In the accompanying drawings:

Fig. 2 is a plan view of a portion of the base, showing the supporting bar broken away;

Fig. 3 is a sectional elevation on the line 3—3, Fig. 2;

Fig. 4 is a sectional view on the line 4—4, Fig. 3;

Fig. 5 is a sectional view through the two pipe clamps;

Fig. 6 is a sectional view of the coupling on the line 6—6, Fig. 5; and

Fig. 7 is a side view of the coupling.

Figure 1:
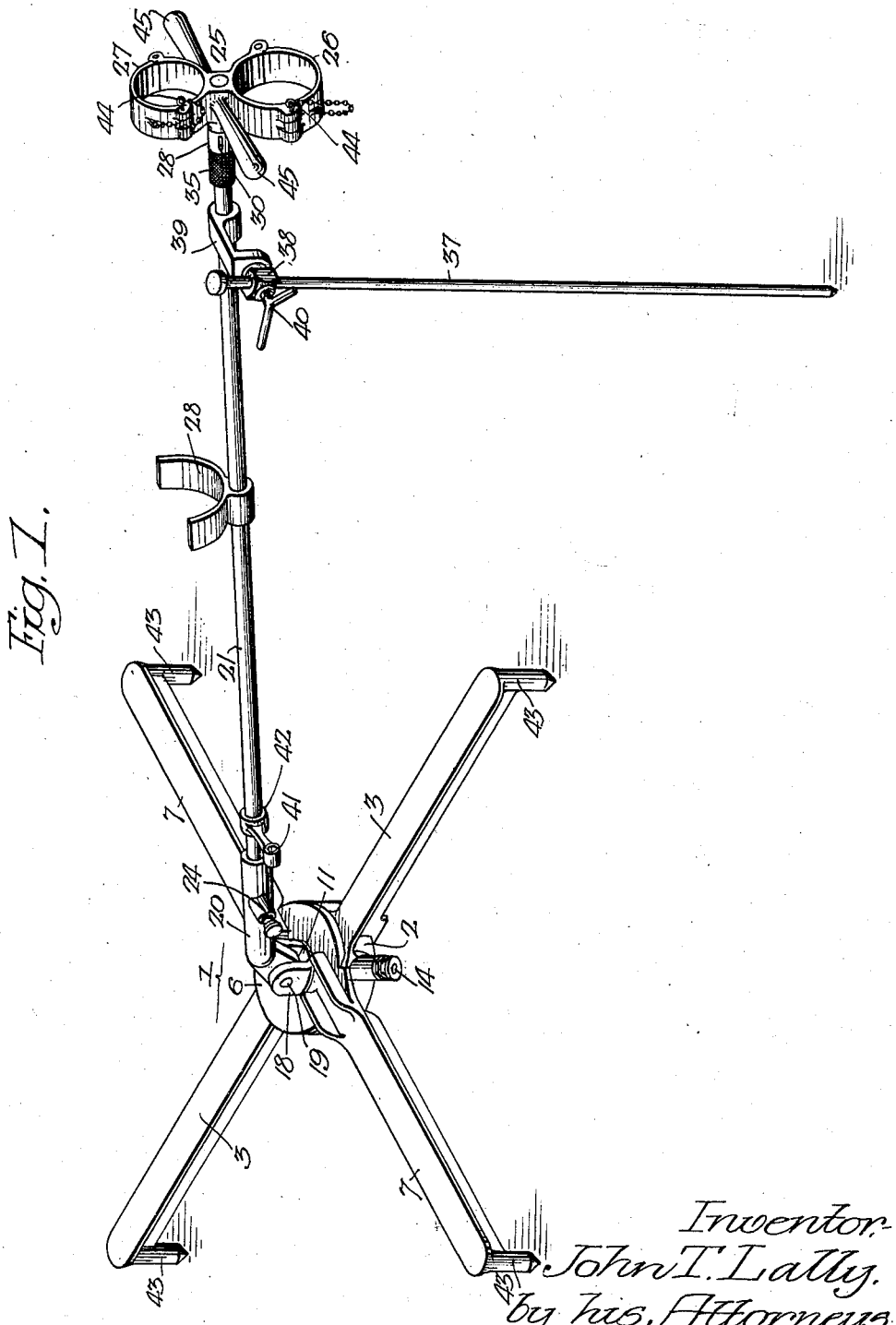
Fig. 1 is a perspective view of my improved pipe holder for high pressure systems in position to receive a pipe of small diameter.

Referring to the drawings, the base of the pipe holder 1 is made in two sections, which are pivotally connected, as shown in Figs. 2 and 3. One section has a hub 2 and arms 3. The hub has a deep flange 4, in which rests the flange 5 of the hub 6 of the other section, which has arms 7. The hub 6 has a central tubular pivot 8, which extends through an opening 9 in the hub 2. Mounted in the central pivot 8 is a stud 10, which projects through a plate 11. The lower end of this stud is screw-threaded, as at 12, to receive a nut 13. The sections are rotatable about the pivot from a closed position wherein the arms of the section lie in side-to-side relation to an open or extended position wherein the arms of the sections are perpendicularly related. In order to lock the two parts of the base together when extended, a bolt 14 is mounted on the hub 2. This bolt extends through an opening 15 in the flange 5 of the hub 6. A spring 16 is located between the head of the bolt and the screw plug 17 and tends to keep the bolt in the projected position. On the plate 11 are bearings 18 for a pivot pin 19 on which is mounted a socket member 20 for a rod 21. The rod extends into the socket member, as shown, and has a groove 22 into which extends a pin 23. This pin holds the rod 21 from turning in its socket. In order to lock the rod to the socket, a spring bolt 24 is provided, which enters a hole 24ª in the rod, Fig. 4, thereby providing a means for preventing the accidental withdrawal of the rod.

On the outer end of the rod is a clamp head 25, which is swiveled so as to bring either the large clamp 26 or the small clamp 27 in line with the pipe or hose support 46, which is secured on the rod. The clamp head 25 is loosely mounted on the end of the rod, as illustrated in Fig. 5. Arranged to slide on the rod is a clutch sleeve 28, which is slotted at 29 to receive a transverse pin 30. The clutch sleeve 28 has projections 31, which enter notches 32 in the hub 33 of the clamp head 25. On the screw threaded portion 34 of the rod is a screw sleeve 35, which holds the clutch sleeve 28 in engagement with the hub of the clamp head 25 and locks it in either of its two positions. When it is desired to reverse the clamp head, the screw threaded sleeve is backed off, which releases the clutch sleeve 28 and allows the clamp head to turn freely on the rod. A nut 36 on the reduced screw threaded end of the rod 21 forms an outer bearing for the clamp head.

In order to support the outer end of the rod, a strut 37 is provided, which is preferably pointed at one end and has a head at the opposite end. The strut passes through a swivel block 38 on a bracket 39 that is secured to the rod 21. A clamp screw 40 locks the strut in any position desired.

When the device is not in use, the strut 37 is turned and is moved longitudinally so as to enter an opening 41 in a bracket 42 on the lower end of the rod 21 and is held in this position by the clamp screw 40.

On the ends of the arms 3 and 7 of the base are pointed feet 43, which can be forced into the ground or other support, to retain the base in position.

The device is so constructed that the base can be folded into small compass and the rod, and its parts, can be readily detached from the base. When it is desired to place the device in position, the base is extended and the rod is attached thereto, after which the strut is adjusted and the clamp head is turned into either position, depending upon the diameter of the pipe or nozzle to be supported. Each clamp is made in two parts, held by a pin 44. On the clamp head are two handles 45 by means of which a fireman holds the device and directs the stream projected from the nozzle.

I claim:

1. The combination in a pipe holder, of a base made in two parts pivotally connected, each part having a hub and two arms; means for locking the two parts in a projected position; a plate, having a pivot pin, extending through the hubs of the two parts; bearings on the plate; a socket member mounted in the bearings; a rod detachably connected to the socket member; and a clamp head at the outer end of the rod.

2. The combination in a pipe holder; of a base made in two parts having flanges thereon and being pivotally connected; a spring bolt on one part arranged to enter an opening in the flange on the other part; a plate having a pin extending through the hubs of both parts; bearings on the plate; a transverse pin mounted in the bearings; a socket member pivotally mounted on the pin; a rod removably mounted in the socket member; a spring bolt on the socket member arranged to engage the rod and to hold it in position, and a pipe support on the rod.

3. The combination in a pipe holder; of a base made in two parts, each part having a hub and flanges thereon and being pivotally connected; a spring bolt on one part arranged to enter an opening in the flange on the other part; a plate having a pin extending through the hubs of both parts; bearings on the plate; a transverse pin mounted in the bearings; a socket member pivotally mounted on the pin; a rod removably mounted in the socket member; a spring bolt on the socket member arranged to engage the rod and to hold it in position; a pipe support on the rod; a clamp head swiveled on the end of the rod, having a clamp by which to hold the pipe; and locking means for the clamp head.

4. The combination in a pipe holder; of a base made in two parts, each part having a hub and flanges thereon and being pivotally connected; a spring bolt on one part arranged to enter an opening in the flange on the other part; a plate having a pin extending through the hubs of both parts; bearings on the plate; a transverse pin mounted in the bearings; a socket member pivotally mounted on the pin; a rod removably mounted in the socket member; a spring bolt on the socket member arranged to engage the rod and to hold it in position; a pipe support on the rod; a clamp head swiveled on the end of the rod, having a clamp by which to hold the pipe; handles on the clamp head to permit manual control thereof, and consequent control of the pipe; and locking means for the clamp head.

5. The combination in a pipe holder, of a base made of two substantially circular sections, substantially concentric with each other, and arranged one above the other; each of said sections having arms, the sections being relatively rotatable from a closed position wherein the arms lie in side-to-side relation to an open position wherein the arms are substantially perpendicularly related; means for locking the two sections in their open position; a socket pivotally mounted on the base; a pipe-holding rod; means for detachably connecting the rod to the socket; and a clamp head pivotally mounted on the rod.

JOHN T. LALLY.